US012607338B1

(12) United States Patent
Liu

(10) Patent No.: US 12,607,338 B1
(45) Date of Patent: Apr. 21, 2026

(54) BASE WITH RETRACTABLE CHARGING CABLE AND DESK LAMP WITH BASE

(71) Applicant: Dongguan Ling Gui Technology Innovation Co., Ltd., Dongguan City (CN)

(72) Inventor: Xia Liu, Dongguan City (CN)

( * ) Notice: Subject to any disclaimer, the term of this patent is extended or adjusted under 35 U.S.C. 154(b) by 0 days.

(21) Appl. No.: 19/243,204

(22) Filed: Jun. 19, 2025

(30) Foreign Application Priority Data

May 30, 2025 (CN) ........................ 202521092990.6

(51) Int. Cl.
*F21V 27/00* (2006.01)

(52) U.S. Cl.
CPC .................................... *F21V 27/00* (2013.01)

(58) Field of Classification Search
CPC .......... F21V 27/00; H01R 13/60; H02G 11/02
USPC .......................................................... 439/501
See application file for complete search history.

(56) References Cited

U.S. PATENT DOCUMENTS

2019/0195483 A1* 6/2019 Workman ............... F21V 27/00

* cited by examiner

*Primary Examiner* — Tulsidas C Patel
*Assistant Examiner* — Jeffrey Mountain
(74) *Attorney, Agent, or Firm* — Nitin Kaushik

(57) ABSTRACT

The present invention aims to provide a base with a retractable charging cable, which includes a base housing, a main circuit board, an output data cable and a mounting seat, where the main circuit board is electrically connected to an input power supply, the mounting seat comprises a wire spool, the wire spool rotates circumferentially and is axially and fixedly provided inside the base housing, an elastic reset structure is provided between the wire spool and the output data cable, the base housing is provided with an output hole, the output data cable has one end electrically connected to the main circuit board and the other end extending out of the output hole. The present application can charge an external intelligent terminal without using an external plug, and can preserve the cleanness of a cable.

12 Claims, 12 Drawing Sheets

BASE WITH RETRACTABLE CHARGING CABLE AND DESK LAMP WITH BASE

TECHNICAL FIELD

The present invention relates to the field of electric household appliances, and more particularly, to a base with a retractable charging cable and a desk lamp with the base.

BACKGROUND ART

Current mainstream desk lamp products predominantly adopt a three-segment structural design including a power supply base, support rod, and lighting module. Regarding power supply methods, conventional desk lamps typically rely on external AC power adapters to achieve single-function illumination. Existing products focus solely on basic lighting requirements during functional development, failing to adequately address users' multi-scenario power demands. For instance, when users require simultaneous charging of smart terminals (e.g., laptops, smartphones, tablets), they must depend on additional power supply devices. This multi-device charging demand forces users to occupy multiple charging ports concurrently, which in limited-space scenarios such as office desktops frequently leads to potential safety hazards including cable entanglement and accumulation of power strips, significantly reducing spatial utilization efficiency.

SUMMARY OF THE INVENTION

An objective of the present invention is to provide a base with a retractable charging cable, which can charge an external intelligent terminal without using an external plug, and can preserve the cleanness of a cable.

A base with a retractable charging cable, including a base housing, where a main circuit board, an output data cable and a mounting seat are provided inside the base housing, the main circuit board is electrically connected to an input power supply, the mounting seat includes a wire spool for the output data cable to be wound around, the wire spool rotates circumferentially and is axially and fixedly provided inside the base housing, an elastic reset structure is provided between the wire spool and the output data cable, the base housing is provided with an output hole, the output data cable has one end electrically connected to the main circuit board and the other end extending out of the output hole.

By using the above-mentioned technical solution, the input power supply supplies power to the main circuit board, the main circuit board then supplies power to the output data cable, and the output data cable then supplies power to the external intelligent terminal; and the arrangement of the wire spool enables the output data cable to be drawn and used by a user, and when required to be used, the elastic reset structure and the wire spool are used to retract into the base housing.

Preferably, the mounting seat includes an upper housing and a lower housing which are detachably and fixedly connected, a receiving cavity is formed between the upper housing and the lower housing, and the wire spool is provided in the receiving cavity and is connected with the upper housing and/or the lower housing in a circumferentially rotating and axially fixed manner.

Preferably, a secondary circuit board is connected to the upper housing or the lower housing and is located in the receiving cavity, the secondary circuit board is electrically connected to the main circuit board, and the output data cable is electrically connected to the secondary circuit board.

By using the above-mentioned technical solution, the output data cable is constrained in the receiving cavity, and the output data cable extends out of the output hole or retracts into the receiving cavity, the output data cable is not cluttered inside the base housing, and the output data cable is not disengaged from the wire spool, so as to ensure that the extension or retraction of the output data cable is stable and reliable.

Preferably, the wire spool includes a planar portion, a support portion with a port, and a planar coil-shaped elastic portion, the elastic portion is placed in the port of the support portion, and an outer free end of the elastic portion is arranged in an elastic structure; and when the output data cable is wound over the support portion, the output data cable is in contact connection with the elastic structure.

Preferably, the support portion includes a first arc-shaped section and a second arc-shaped section, a first gap and a second gap are formed between the first arc-shaped section and the second arc-shaped section, an outer free end of the elastic portion extends out of the first gap and is folded back into the port of the support portion via the first arc-shaped section and the second gap, the outer free end of the elastic portion is arranged in a protruding shape near the first gap and towards one side of the output data cable to constitute an elastic reset structure, and the elastic reset structure is in contact connection with the output data cable.

By using the above-mentioned technical solution, the elastic portion is stably and reliably placed in the port of the support portion, and no displacement occurs when the output data cable is telescoped, and at the same time, the elastic reset structure enables the output data cable to be quickly and stably retracted into the mounting seat.

Preferably, the planar portion is provided with a through hole, a third arc-shaped section is provided at a side, facing away from the elastic portion, of the second arc-shaped section, the second arc-shaped section and the third arc-shaped section are located at two sides of the through hole, one end of the output data cable is placed between the second arc-shaped section and the third arc-shaped section, and the through hole is electrically connected to the secondary circuit board.

By using the above-mentioned technical solution, when the output data cable is almost completely drawn out of the output hole, if the end of the output data cable located in the base housing is not constrained, a dislocation or disorder may occur when the output data cable is retracted, and the arrangement of the second arc-shaped section and the third arc-shaped section can constrain the end of the output data cable located in the base housing, so as to ensure that the output data cable can be kept clean and orderly when it is retracted into the base housing.

Preferably, at least two mounting seats are provided, each mounting seat is provided with an output data cable, and the number of the output holes, the mounting seats and the output data cables are in one-to-one correspondence.

By using the above-mentioned technical solution, different output data cables can have different connectors, such as a USB connector, a type-c connector and a Lightning connector, so as to facilitate the charging of intelligent terminals with different interfaces and improve the practicality of the base.

Preferably, a battery electrically connected to the main circuit board is also provided inside the base housing, and the base housing is provided with a charging port electrically connected to the battery.

By using the above-mentioned technical solution, the arrangement of the battery enables the base to provide a power supply via the battery when no external power supply supplies power, thereby improving the practicability of the base.

Preferably, a clamping portion is provided at the surface of the base housing for embedding one end of the output data cable protruding out of the output hole.

By using the above-mentioned technical solution, when there is no need to use the output data cable, one end of the output data cable exposed outside the base housing can be embedded in the clamping portion, and on the one hand, the output data cable can be protected, and on the other hand, the space occupied by the base can also be reduced.

Preferably, the base housing is further provided with a wireless charging module for wirelessly charging an external intelligent terminal.

Preferably, the base housing is provided with a housing through hole, the wireless charging module is provided between the base housing and the mounting seat, the wireless charging module includes a wireless charging housing and a wireless charging circuit unit located in the wireless charging housing, and the wireless charging housing is embedded in the housing through hole.

By using the above-mentioned technical solution, a wireless charging module is additionally provided on the base housing, and intelligent terminals such as a mobile phone, an intelligent watch and an intelligent ring can be charged wirelessly; and a base can have multiple charging forms, and can also charge different terminals at the same time, so as to further improve the practicability of the base.

An objective of the present invention is to provide a desk lamp with any one of the above-mentioned bases with a retractable charging cable, which can charge an external intelligent terminal without using an external plug, and can preserve the cleanness of a cable, thereby improving the practicability of the desk lamp.

A desk lamp including a lighting lamp head, a connecting rod, and a base, where the base is the base as described above.

By using the above-mentioned technical solution, the practicability of the desk lamp is greatly improved, and other intelligent terminals can also be provided with electric energy when the desk lamp is used.

Figure 1:
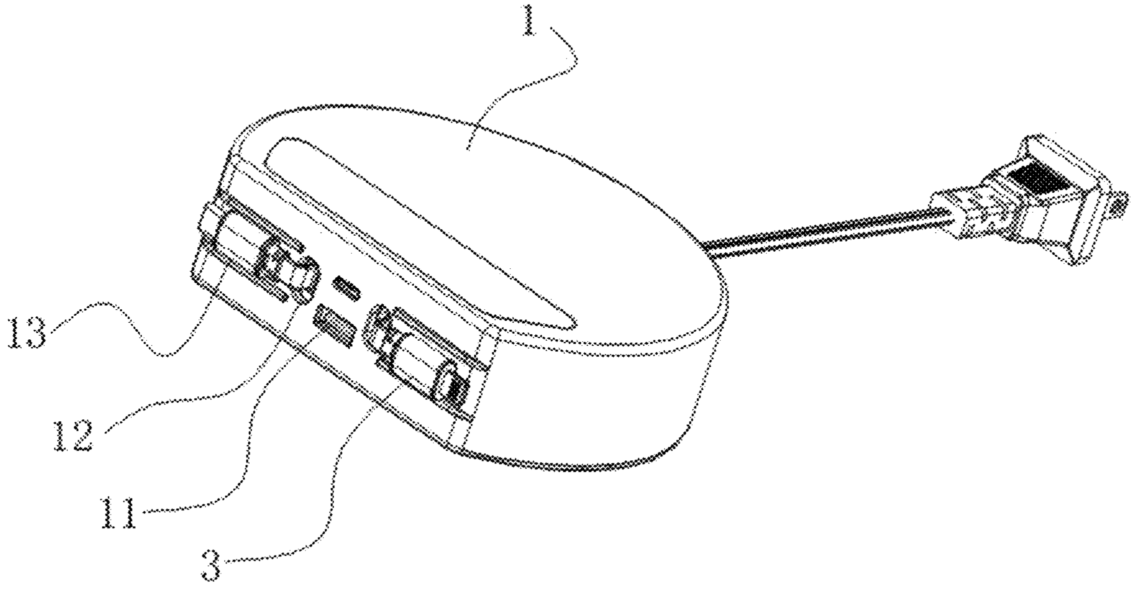
FIG. 1 is a first schematic structural diagram showing Embodiment I of a base with a retractable charging cable.
Figure 2:
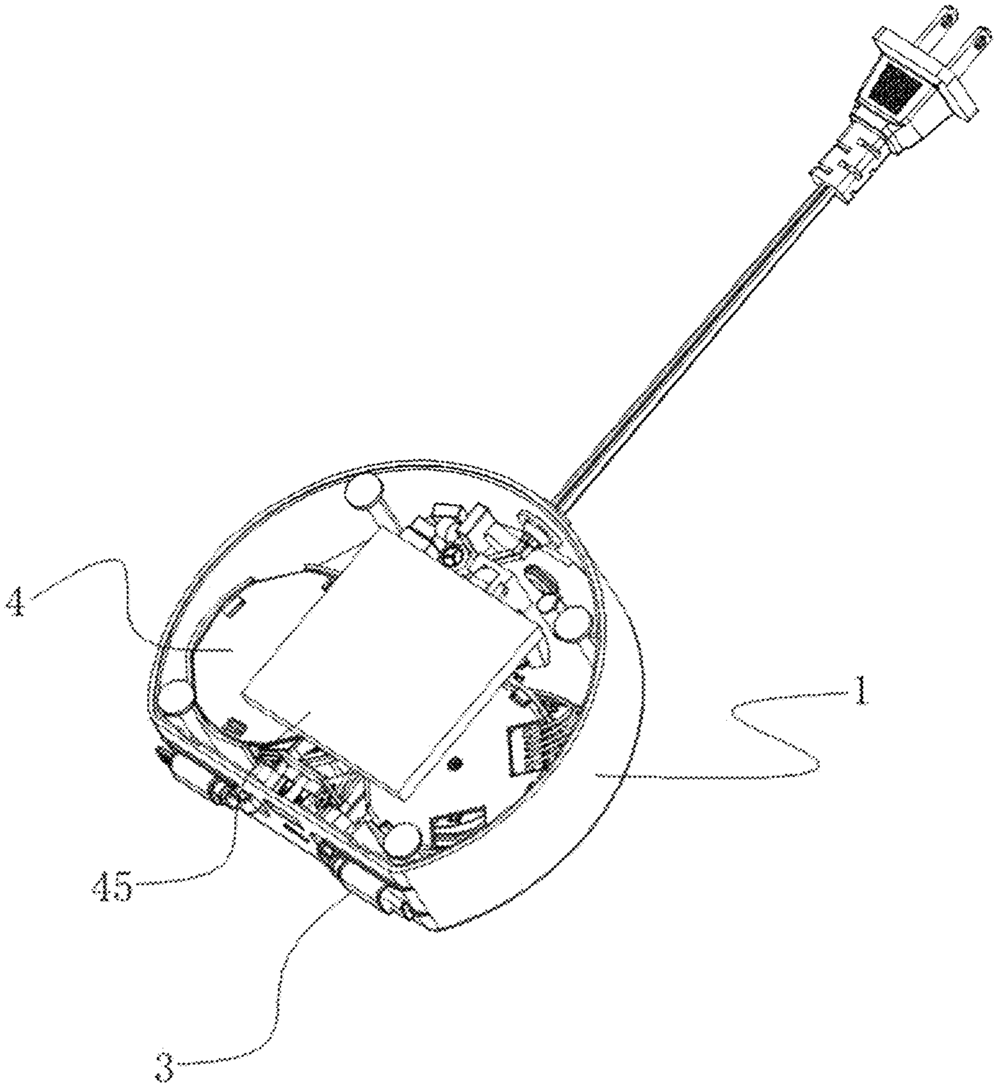
FIG. 2 is a first internal structural diagram showing Embodiment I of a base with a retractable charging cable.
Figure 3:
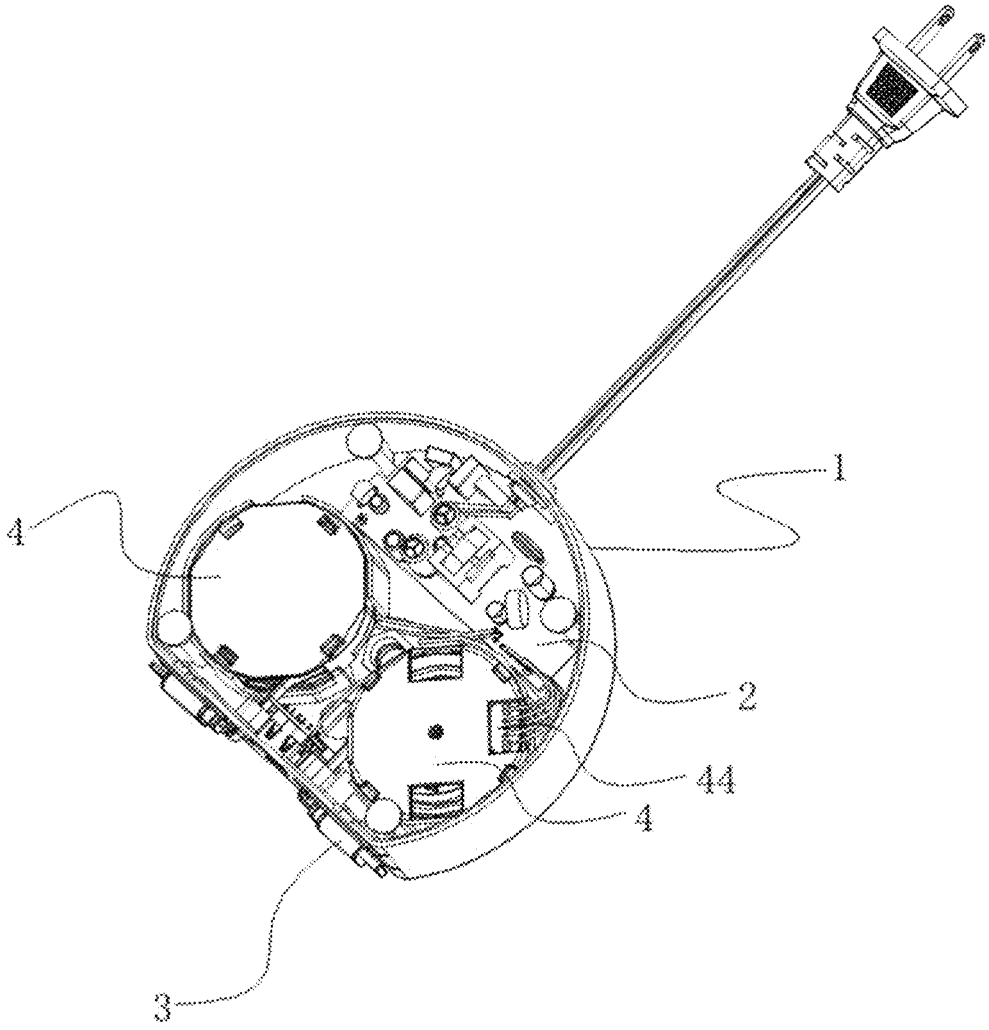
FIG. 3 is a second internal structural diagram showing Embodiment I of a base with a retractable charging cable.
Figure 4:
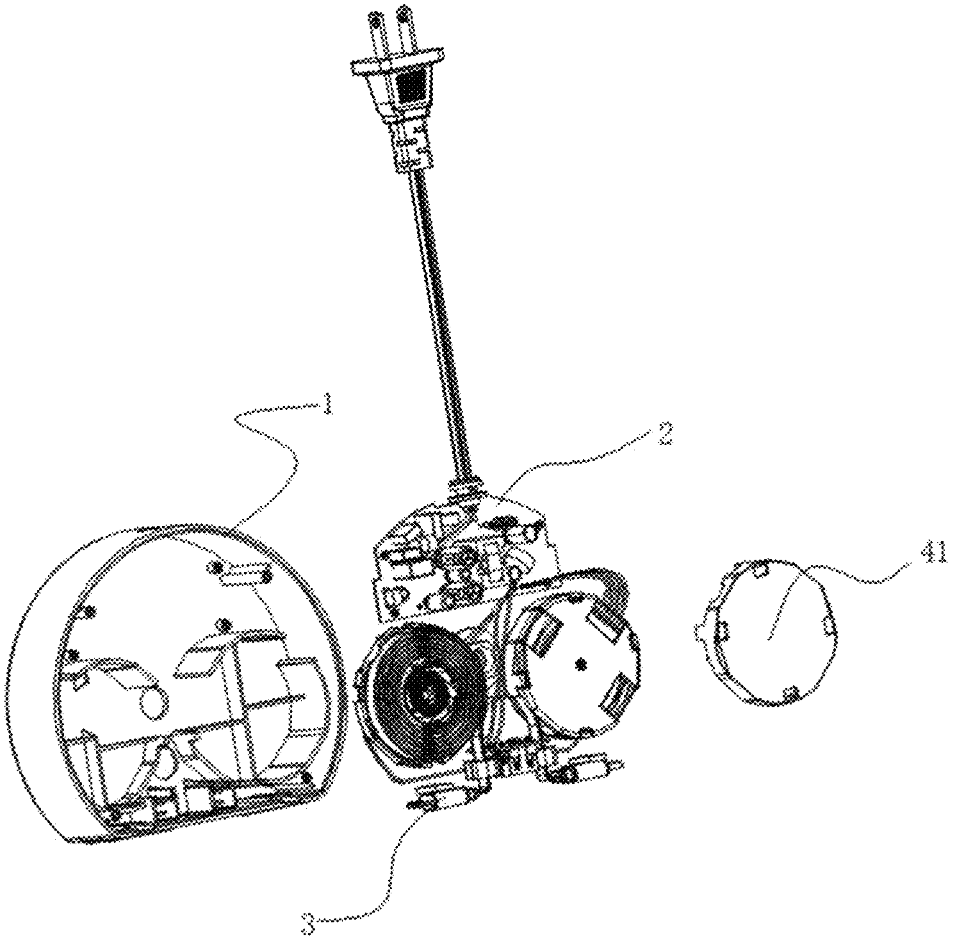
FIG. 4 is a first exploded view of Embodiment I of a base with a retractable charging cable.
Figure 5:
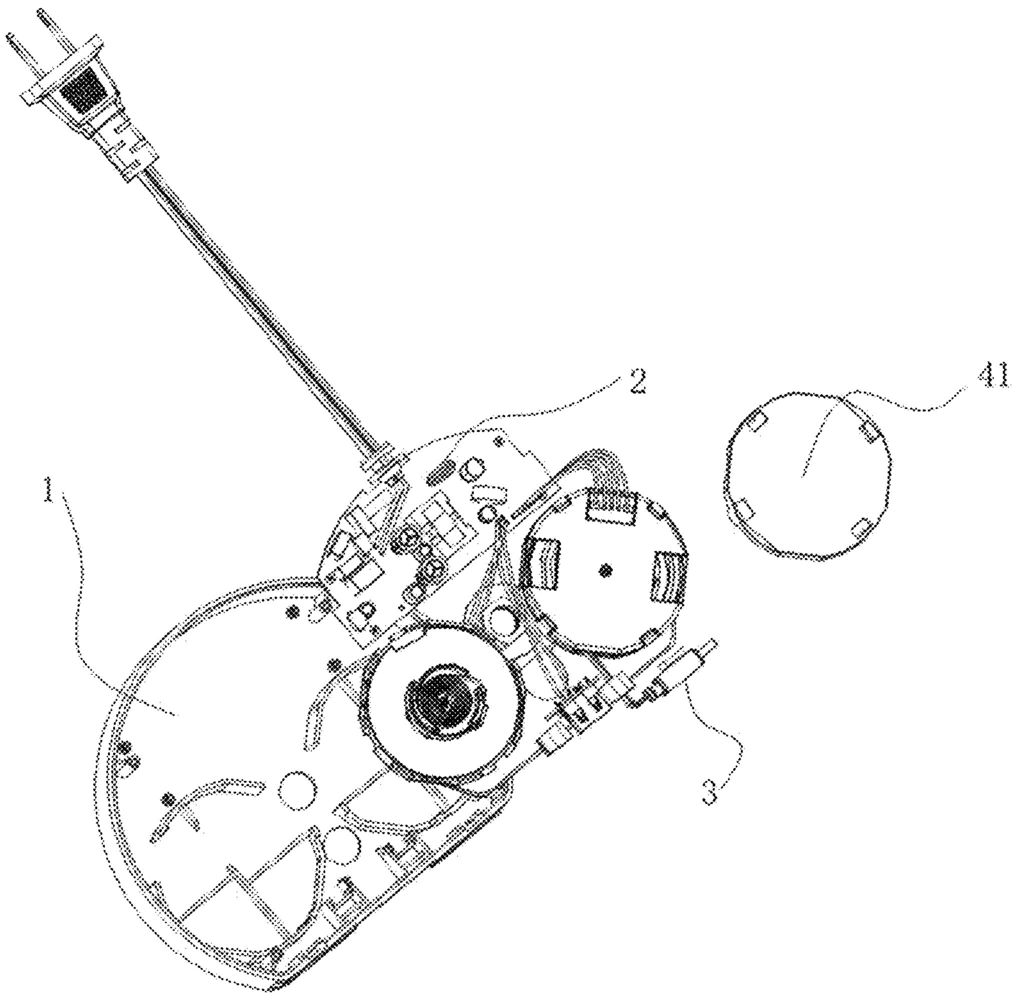
FIG. 5 is a second exploded view of Embodiment I of a base with a retractable charging cable.
Figure 6:
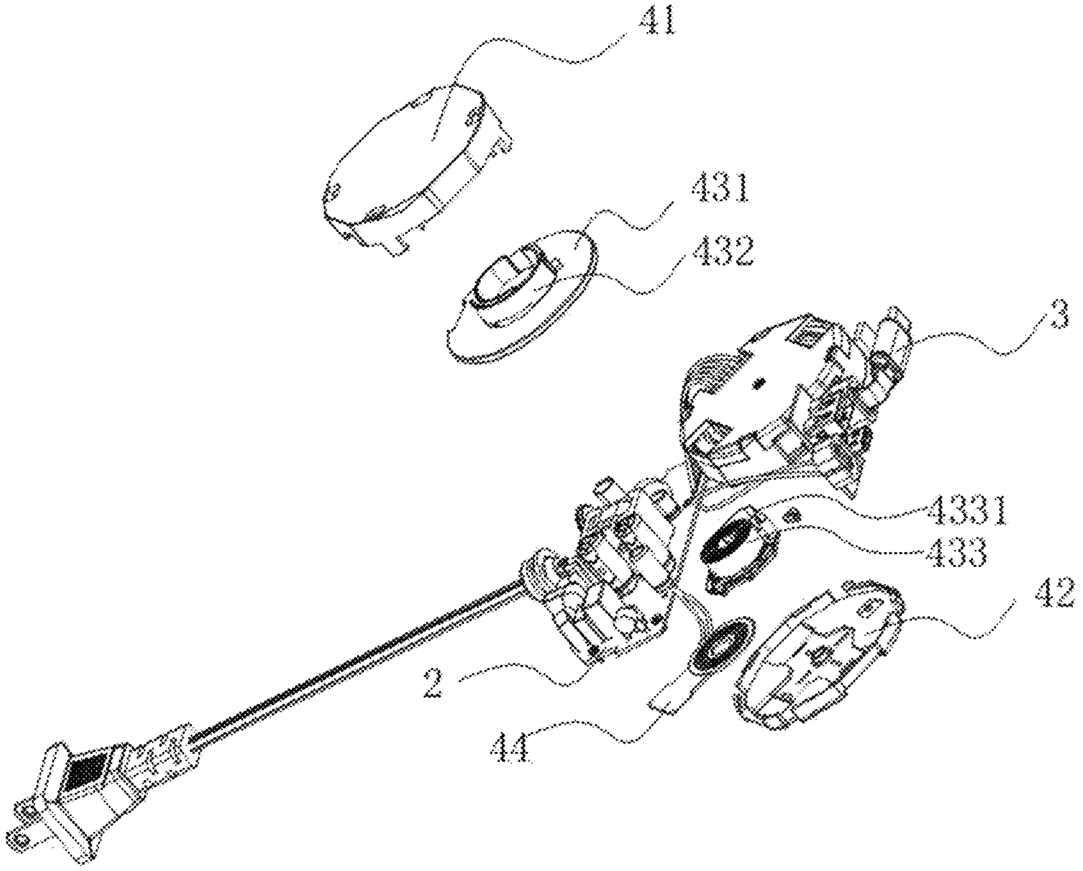
FIG. 6 is a third exploded view of Embodiment I of a base with a retractable charging cable.
Figure 7:
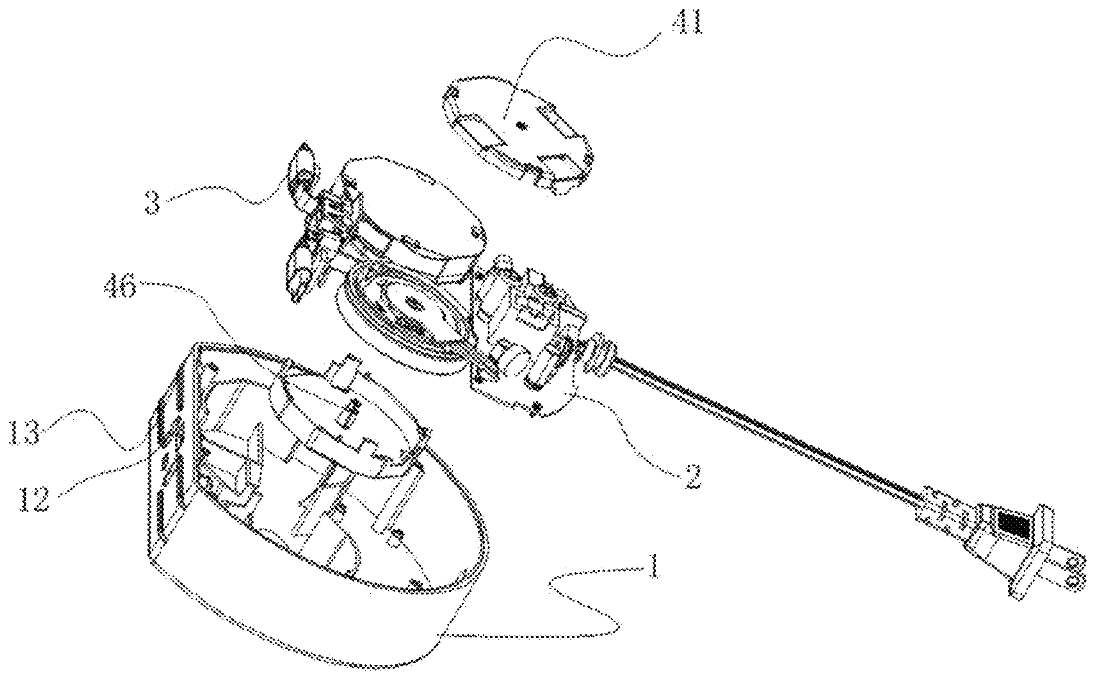
FIG. 7 is a fourth exploded view of Embodiment I of a base with a retractable charging cable.
Figure 8:
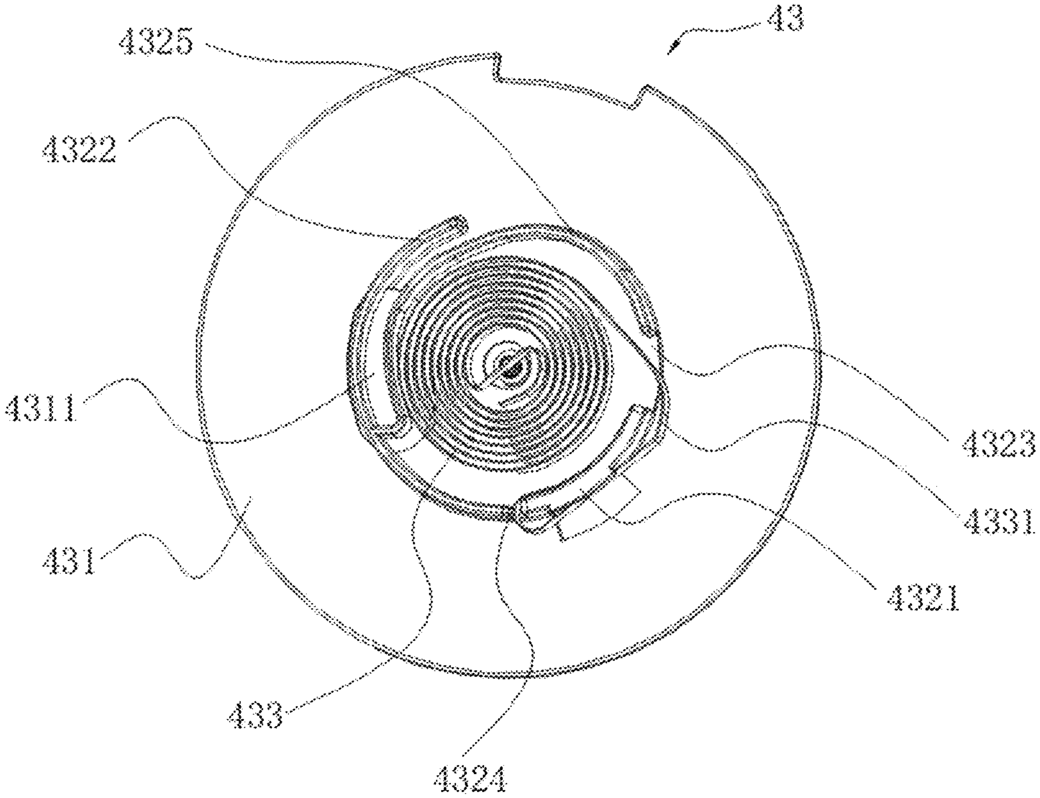
FIG. 8 is a schematic structural diagram showing a wire spool.

1. base housing; 11. charging port; 12. output hole; 13. clamping portion; 14. housing through hole; 2. main circuit board; 3. output data cable; 4. mounting seat; 41. upper housing; 42. lower housing; 43. wire spool; 431. planar portion; 4311. through hole; 432. support portion; 4321. first arc-shaped section; 4322. second arc-shaped section; 4323. first gap; 4324. second gap; 4325. third arc-shaped section; 433. elastic portion; 4331. elastic reset structure; 44. secondary circuit board; 45. battery; 46. connecting rotation shaft; 5. lighting lamp head; 6. connecting rod; 7. wireless charging module; 71. wireless charging housing; 72. wireless charging circuit unit.

DETAILED DESCRIPTION OF THE INVENTION

The present invention will now be further described with reference to FIGS. 1-12.

Embodiment I

As shown in FIGS. 1-8, a base with a retractable charging cable includes a base housing 1, where the base housing 1 includes an upper base housing and a lower base housing, the upper base housing and the lower base housing form a base cavity, and a main circuit board 2, an output data cable 3 and a mounting seat 4 are provided inside the base cavity.

The mounting seat 4 includes an upper housing 41, a lower housing 42 and a wire spool 43, and the upper housing 41 and the lower housing 42 are detachably and fixedly connected (the "detachable and fixedly connected" here refers to, for example, a bolt connection, a snap connection, a plug connection, etc., i.e., a connection form which is fixed in a connected state, but can be detached and separated from the upper housing 41 and the lower housing 42).

A receiving cavity is formed between the upper housing 41 and the lower housing 42, a wire spool 43 is provided in the receiving cavity, and a secondary circuit board 44 is further provided between the wire spool 43 and the upper housing 41 or between the wire spool 43 and the lower housing 42. The main circuit board 2 is electrically connected to the input power supply, the secondary circuit board 44 is electrically connected to the main circuit board 2, and the output data cable 3 is electrically connected to the secondary circuit board 44. It should be noted herein that the main circuit board 2 and the secondary circuit board 44 may actually be one circuit board, or the output data cable 3 may be directly electrically connected to the main circuit board 2, but if the two circuit boards are provided separately, the secondary circuit board 44 may be built in the mounting seat 4 so as to facilitate the electrical connection between the output data cable 3 and the secondary circuit board 44, and at the same time, if a plurality of mounting seats 4 are provided, the electrical connection with other data cables in other mounting seats 4 will not be affected if there is a problem in the electrical circuit in one mounting seat 4.

It should be noted that the input power supply here may be an external input power supply, or a battery 45 electrically connected to the main circuit board 2 is further provided inside the base housing 1, and the battery 45 obtains power from the outside, and then the battery 45 supplies power to the main circuit board 2 or/and the secondary circuit board 44. Preferably, the base is preferably provided with a power input line electrically connected to the external input power supply, and the base housing 1 is also provided with the battery 45, so that the base can also be used to supply power to the external intelligent terminal in the event of external power failure. The base housing 1 is provided with a charging port 11 electrically connected to the battery 45. Here, the charging port 11 may be an input interface for the battery 45, an output interface for charging an external terminal of the battery 45, or a combination thereof.

The wire spool 43 includes a planar portion 431, a support portion 432 with a port, and a planar coil-shaped elastic portion 433. The planar portion 431 is used to support the bottom of the output data cable 3 after being wound in a circle, the support portion 432 is used to support the center of the output data cable 3 when being wound, and the elastic portion 433 mainly assists the output data cable 3 in providing a restoring force when being retracted into the mounting seat 4.

The wire spool 43 is provided in the receiving cavity and is connected with the upper housing 41 or/and the lower housing 42 in a circumferentially rotating and axially fixed manner, specifically, a connecting rotation shaft 46 can be provided between the wire spool 43 and the upper housing 41 or/and the lower housing 42, the center of the wire spool 43 is sleeved on the connecting rotation shaft 46 with a clearance fit or an over-fit, and the connecting rotation shaft 46 is fixedly connected with the upper housing 41 and the lower housing 42. It should be noted that one connecting bearing may be fixedly sleeved over the surface of the connecting rotation shaft 46 so as to rotate circumferentially and axially, and the connecting rotation shaft 46 may be fixedly connected between the upper housing 41 and/or the lower housing 42, and the bearing may be fixedly connected to the wire spool 43, and the bearing may not be provided in order to save costs.

The support portion 432 includes a first arc-shaped section 4321 and a second arc-shaped section 4322, a first gap 4323 and a second gap 4324 are formed between the first arc-shaped section 4321 and the second arc-shaped section 4322, an outer free end of the elastic portion 433 extends out of the first gap 4323 and is folded back into the port of the support portion 432 via the first arc-shaped section 4321, the second gap 4324 is placed in the port of the support portion 432, the elastic portion 433 is placed in the port of the support portion 432, and the outer free end of the elastic portion 433 is arranged in an elastic structure, and the output data cable 3 is in contact connection with the elastic structure when being arranged around the support portion 432. As a preferred embodiment, the elastic portion 433 is folded back to a portion placed in the port of the support portion 432, and is preferably attached to an inner wall of the first arc-shaped section 4321, so that the output data cable 3 is stretched and contracted by frequently pulling the elastic portion 433 for a long period of time, and it is also ensured that the elastic portion 433 is stably and reliably housed inside the support portion 432 without being displaced, and an outer free end of the elastic portion 433 is provided in a protruding shape near the first gap 4323 and towards the output data cable 3 side to constitute an elastic reset structure 4331, and the elastic reset structure 4331 is in an interference connection with the output data cable 3. Here, it is to be noted that the elastic reset structure 4331 may be an outer free end of the entire elastic portion 433, and in order to achieve both the mounting stability of the elastic portion 433 and the reliable reset of the output data cable 3, it is preferable that the outer free end of the elastic portion 433 has one portion attached to the first arc-shaped section 4321 and the other portion constituting the elastic reset structure 4331.

The base housing 1 is provided with a charging port 12, the output data cable 3 has one end electrically connected to the main circuit board 2 via the secondary circuit board 44, has a middle portion provided on the support portion 432 with a port, and is partially connected to the elastic reset structure 4331 of the elastic portion 433 in an interference manner, and has the other end passing out of the charging port 12 for a user to draw and use and provides charging for an intelligent terminal. That is, the input power supply supplies power to the main circuit board 2, the main circuit board 2 then supplies power to the output data cable 3, and the output data cable 3 then supplies power to the external intelligent terminal; and the arrangement of the wire spool 43 enables the output data cable 3 to be drawn and used by a user, and when required to be used, the elastic reset structure 4331 and the wire spool 43 are used to retract into the base housing 1.

The surface of the base housing 1 is provided with a clamping portion 13 for embedding one end of the output data cable 3 protruding out of the charging port 12, and when there is no need to use the output data cable 3, one end of the output data cable 3 exposed outside the base housing 1 can be embedded in the clamping portion 13, and on the one hand, the output data cable 3 can be protected, and on the other hand, the space occupied by the base can also be reduced.

The planar portion 431 is provided with a through hole 4311; a third arc-shaped section 4325 is provided at a side, facing away from the elastic portion 433, of the second arc-shaped section 4322; the second arc-shaped section 4322 and the third arc-shaped section 4325 are located at two sides of the through hole 4311; one end of the output data cable 3 is placed between the second arc-shaped section 4322 and the third arc-shaped section 4325, and the through hole 4311 is electrically connected to the secondary circuit board 44; preferably, the second arc-shaped section 4322 and the third arc-shaped section 4325 are fixedly connected at one end of the through hole 4311, and a gap for the output data cable 3 to be arranged is formed between the second arc-shaped section and the third arc-shaped section at the other end of the through hole. When the output data cable 3 is almost completely drawn out of the charging port 12, if the end of the output data cable 3 located in the base housing 1 is not constrained, a dislocation or disorder may occur when the output data cable 3 is retracted, and the arrangement of the second arc-shaped section 4322 and the third arc-shaped section 4325 can constrain the end of the output data cable 3 located in the base housing 1, so as to ensure that the output data cable 3 can be kept clean and orderly when it is retracted into the base housing 1.

Embodiment II

Different from Embodiment I, at least two mounting seats 4 are provided. Each mounting seat 4 is equipped with an output data cable 3, and the quantities of the charging port 12, the mounting base 4, and the output data cable 3 are in one-to-one correspondence, different output data cables 3 can have different connectors, such as a USB connector, a type-c connector and a Lightning connector, so as to facilitate the charging of intelligent terminals with different interfaces and improve the practicality of the base.

Embodiment III

Figure 9:
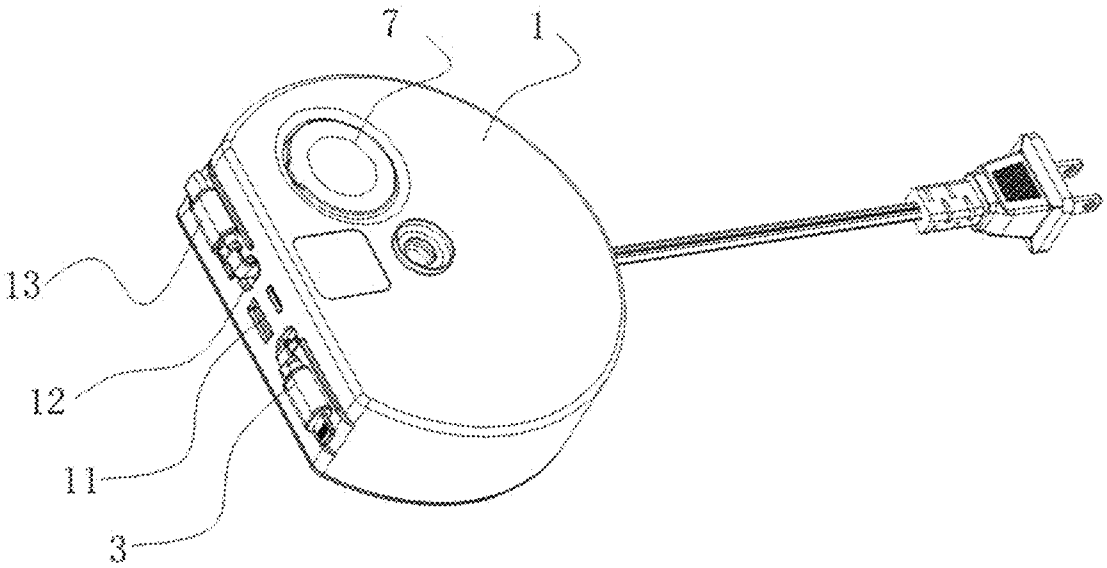
FIG. 9 is a first schematic structural diagram showing an Embodiment II of a base with a retractable charging cable.
Figure 10:
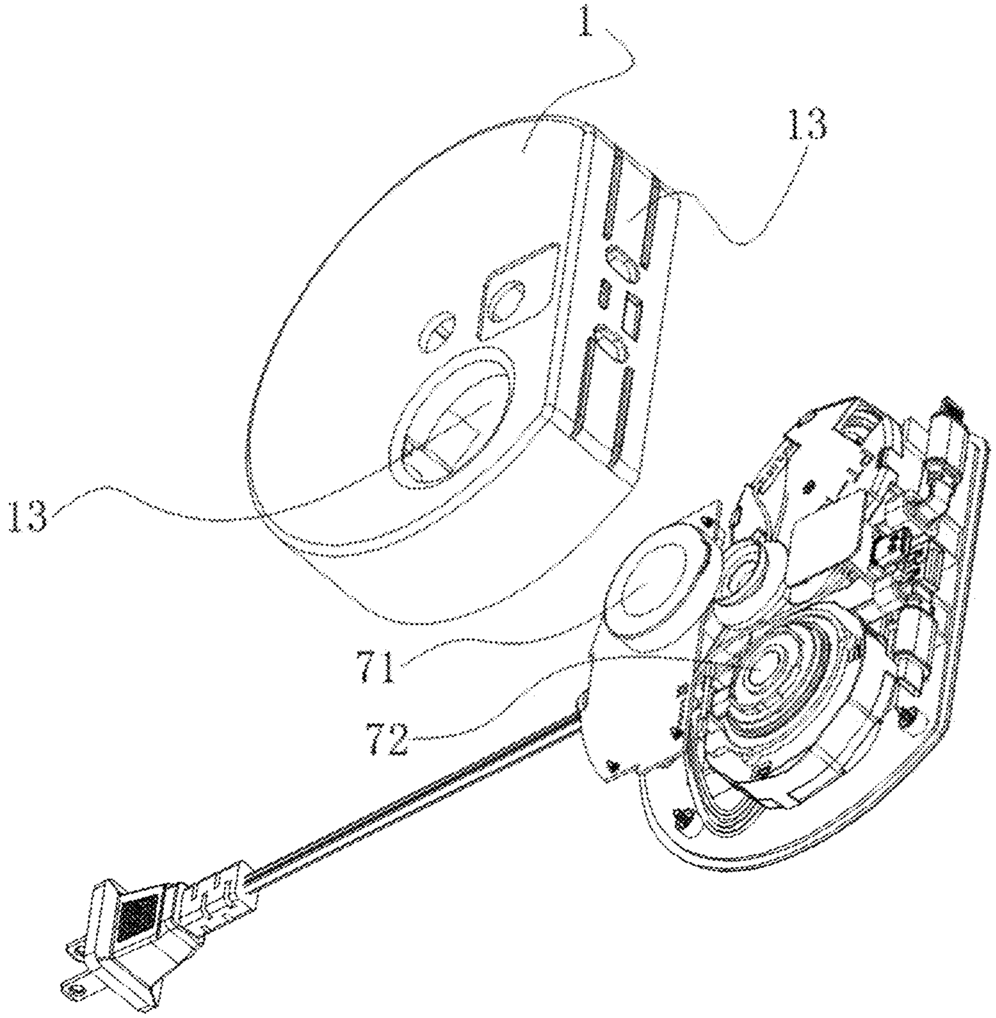
FIG. 10 is a second schematic structural diagram showing an Embodiment II of a base with a retractable charging cable.

As shown in FIGS. 9 and 10, different from Embodiment I, the base housing is provided with a housing through hole, and a wireless charging module for wirelessly charging an external intelligent terminal (such as an electronic product such as a mobile phone, a smart watch, a smart ring, etc.) is embedded in the housing through hole, where the wireless charging module includes a wireless charging housing and a wireless charging circuit unit located in the wireless charging housing, the wireless charging housing is embedded in the housing through hole, and the wireless charging housing can be flush with the surface of the base housing, or lower than the surface of the base housing, or higher than the surface of the base housing.

It should be noted that wireless charging is a relatively mature technology. The wireless charging module may adopt existing commercially available wireless charging structures and circuits. The core inventive concept of the present invention lies in integrating the wireless charging module into the base, rather than innovating the wireless charging module itself. Therefore, the specific structure and circuitry of the wireless charging module are not elaborated herein, as mature commercial wireless charging structures and corresponding circuits may be utilized.

Embodiment IV

Figure 11:
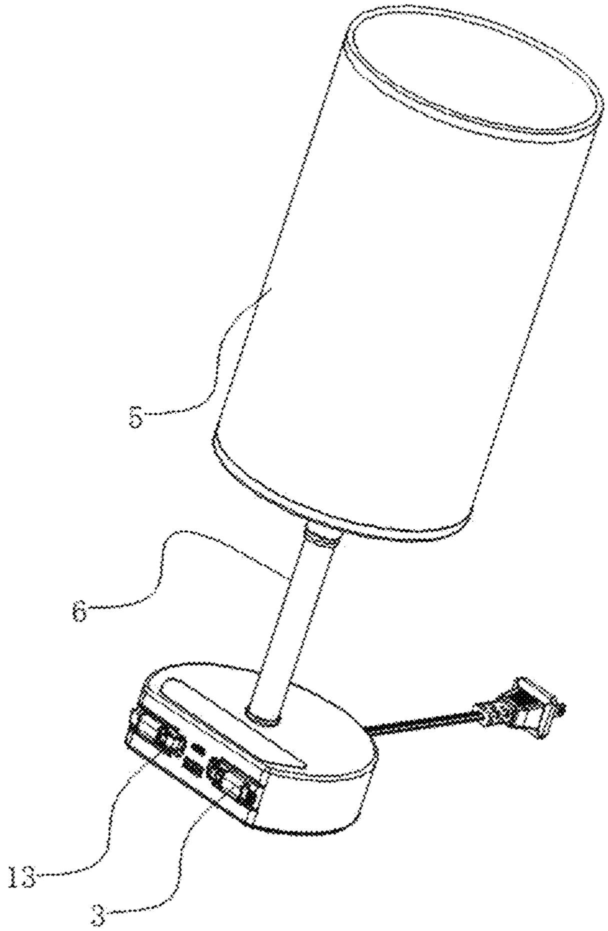
FIG. 11 is a first schematic structural diagram showing a desk lamp with a retractable charging cable base.
Figure 12:
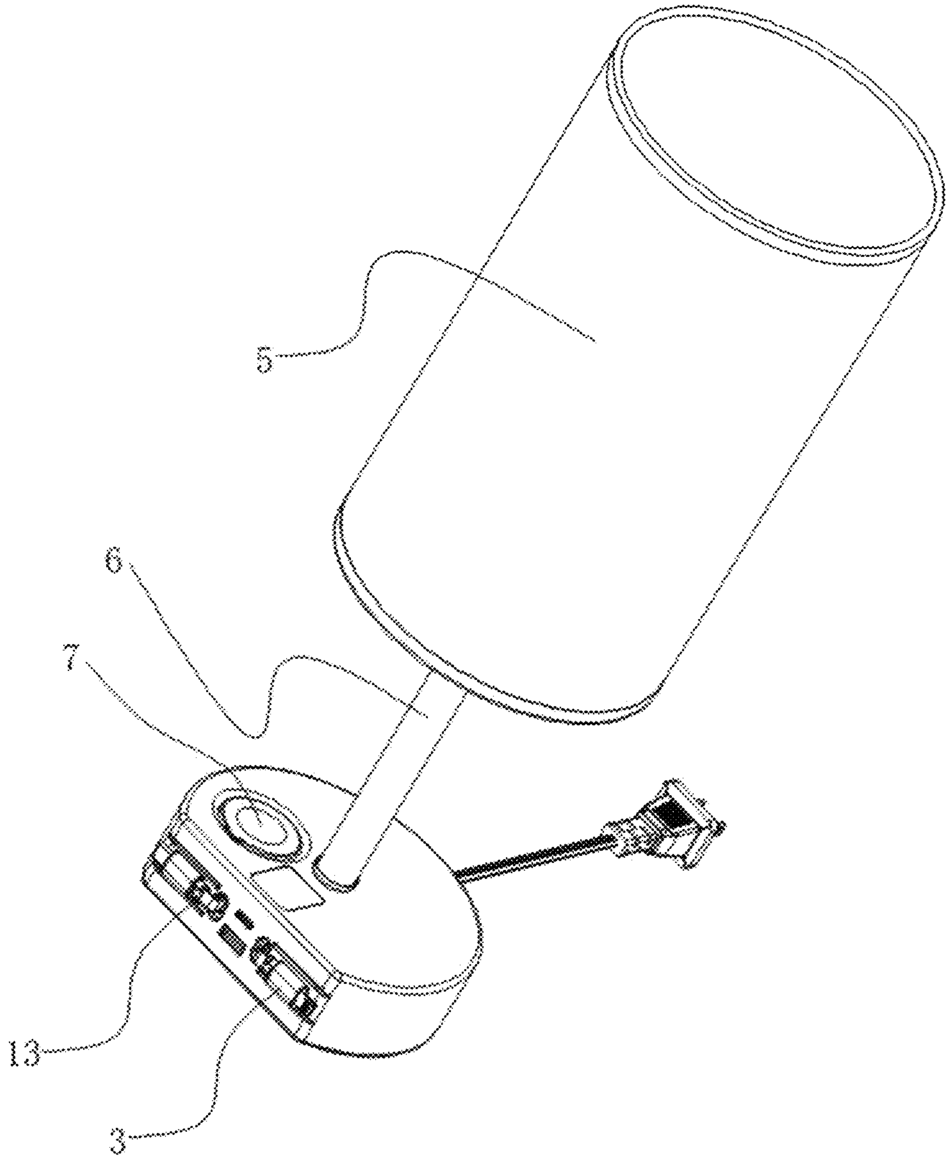
FIG. 12 is a second schematic structural diagram showing a desk lamp with a retractable charging cable base.

As shown in FIGS. 11 and 12, a desk lamp includes a lighting lamp head 5, a connecting rod 6, and a base, where the base is as described in Embodiment I, Embodiment II, or Embodiment III.

By using the above-mentioned technical solution, the practicability of the desk lamp is greatly improved, and other intelligent terminals can also be provided with electric energy when the desk lamp is used. Any one of the above-mentioned bases with a retractable charging cable can charge an external intelligent terminal without using an external plug, and can preserve the cleanness of a cable, thereby improving the practicability of the desk lamp.

The above-mentioned embodiments are merely preferred embodiments of the present invention, and are not intended to limit the scope of the present invention, and any insubstantial changes and substitutions made by a person skilled in the art on the basis of the present invention fall within the scope of the present invention as claimed.

What is claimed is:

1. A base with a retractable charging cable, comprising a base housing, wherein a main circuit board, an output data cable and a mounting seat are provided inside the base housing, the main circuit board is electrically connected to an input power supply, the mounting seat comprises a wire spool for the output data cable to be wound around, the wire spool rotates circumferentially and is axially and fixedly provided inside the base housing, an elastic reset structure is provided between the wire spool and the output data cable, the base housing is provided with an output hole, the output data cable has one end electrically connected to the main circuit board and the other end extending out of the output hole;

wherein a battery electrically connected to the main circuit board is also provided inside the base housing, and the base housing is provided with a charging port electrically connected to the battery.

2. The base with a retractable charging cable according to claim 1, wherein the mounting seat comprises an upper housing and a lower housing which are detachably and fixedly connected, a receiving cavity is formed between the upper housing and the lower housing, and the wire spool is provided in the receiving cavity and is connected with the upper housing and/or the lower housing in a circumferentially rotating and axially fixed manner.

3. The base with a retractable charging cable according to claim 2, wherein a secondary circuit board is connected to the upper housing or the lower housing and is located in the receiving cavity, the secondary circuit board is electrically connected to the main circuit board, and the output data cable is electrically connected to the secondary circuit board.

4. The base with a retractable charging cable according to claim 3, wherein the wire spool comprises a planar portion, a support portion with a port, and a planar coil-shaped elastic portion, the elastic portion is placed in the port of the support portion, and an outer free end of the elastic portion is arranged in an elastic structure; and when the output data cable is wound over the support portion, the output data cable is in contact connection with the elastic structure.

5. The base with a retractable charging cable according to claim 4, wherein the support portion comprises a first arc-shaped section and a second arc-shaped section, a first gap and a second gap are formed between the first arc-shaped section and the second arc-shaped section, an outer free end of the elastic portion extends out of the first gap and is folded back into the port of the support portion via the first arc-shaped section and the second gap, the outer free end of the elastic portion is arranged in a protruding shape near the first gap and towards one side of the output data cable to constitute an elastic reset structure, and the elastic reset structure is in contact connection with the output data cable.

6. The base with a retractable charging cable according to claim 4, wherein the planar portion is provided with a through hole, a third arc-shaped section is provided at a side, facing away from the elastic portion, of the second arc-shaped section, the second arc-shaped section and the third arc-shaped section are located at two sides of the through hole, one end of the output data cable is placed between the second arc-shaped section and the third arc-shaped section, and the through hole is electrically connected to the secondary circuit board.

7. The base with a retractable charging cable according to claim 1, wherein at least two mounting seats are provided, each mounting seat is provided with an output data cable, and the number of the output holes, the mounting seats and the output data cables are in one-to-one correspondence.

8. The base with a retractable charging cable according to claim 1, wherein a clamping portion is provided at the surface of the base housing for embedding one end of the output data cable protruding out of the output hole.

9. The base with a retractable charging cable according to claim 1, wherein the base housing is further provided with a wireless charging module for wirelessly charging an external intelligent terminal.

10. The base with a retractable charging cable according to claim 9, wherein the base housing is provided with a housing through hole, the wireless charging module is provided between the base housing and the mounting seat, the wireless charging module comprises a wireless charging housing and a wireless charging circuit unit located in the wireless charging housing, and the wireless charging housing is embedded in the housing through hole.

11. A desk lamp, comprising a lighting lamp head, a connecting rod, and abase, wherein the base is the base according to claim 1.

12. A base with a retractable charging cable, comprising a base housing, wherein a main circuit board, an output data cable and a mounting seat are provided inside the base housing, the main circuit board is electrically connected to an input power supply, the mounting seat comprises a wire spool for the output data cable to be wound around, the wire spool rotates circumferentially and is axially and fixedly provided inside the base housing, an elastic reset structure is provided between the wire spool and the output data cable, the base housing is provided with an output hole, the output data cable has one end electrically connected to the main circuit board and the other end extending out of the output hole;

wherein the mounting seat comprises an upper housing and a lower housing which are detachably and fixedly connected, a receiving cavity is formed between the upper housing and the lower housing, and the wire spool is provided in the receiving cavity and is connected with the upper housing and/or the lower housing in a circumferentially rotating and axially fixed manner;

wherein a secondary circuit board is connected to the upper housing or the lower housing and is located in the receiving cavity, the secondary circuit board is electrically connected to the main circuit board, and the output data cable is electrically connected to the secondary circuit board;

wherein the wire spool comprises a planar portion, a support portion with a port, and a planar coil-shaped elastic portion, the elastic portion is placed in the port of the support portion, and an outer free end of the elastic portion is arranged in an elastic structure; and when the output data cable is wound over the support portion, the output data cable is in contact connection with the elastic structure; and wherein the support portion comprises a first arc-shaped section and a second arc-shaped section, a first gap and a second gap are formed between the first arc-shaped section and the second arc-shaped section, an outer free end of the elastic portion extends out of the first gap and is folded back into the port of the support portion via the first arc-shaped section and the second gap, the outer free end of the elastic portion is arranged in a protruding shape near the first gap and towards one side of the output data cable to constitute an elastic reset structure, and the elastic reset structure is in contact connection with the output data cable.

* * * * *